(12) United States Patent
Cucala Garcia

(10) Patent No.: US 9,439,115 B2
(45) Date of Patent: Sep. 6, 2016

(54) METHOD FOR CELL RESELECTION AND CELL HANDOVER IN A WIRELESS COMMUNICATION SYSTEM

(75) Inventor: Luis Cucala Garcia, Madrid (ES)

(73) Assignee: Telefonica, S.A., Madrid (ES)

( * ) Notice: Subject to any disclaimer, the term of this patent is extended or adjusted under 35 U.S.C. 154(b) by 483 days.

(21) Appl. No.: 14/122,135

(22) PCT Filed: May 22, 2012

(86) PCT No.: PCT/EP2012/059456
§ 371 (c)(1),
(2), (4) Date: Feb. 14, 2014

(87) PCT Pub. No.: WO2012/160048
PCT Pub. Date: Nov. 29, 2012

(65) Prior Publication Data
US 2014/0148171 A1    May 29, 2014

(30) Foreign Application Priority Data
May 26, 2011   (ES) .................................. 201130865

(51) Int. Cl.
*H04W 36/04*   (2009.01)
*H04W 36/00*   (2009.01)
*H04W 36/30*   (2009.01)

(52) U.S. Cl.
CPC ......... *H04W 36/04* (2013.01); *H04W 36/0083* (2013.01); *H04W 36/30* (2013.01)

(58) Field of Classification Search
CPC . H04W 4/22; H04W 52/0206; H04W 88/08; H04W 36/22; H04W 16/08; H04W 28/08; H04W 52/0235; H04W 36/06; H04W 36/08; H04W 36/18
USPC ....................................................... 455/437
See application file for complete search history.

(56) References Cited

U.S. PATENT DOCUMENTS

| | | | |
|---|---|---|---|
| 2006/0003769 A1* | 1/2006 | Liu .................. | H04W 36/0083 455/436 |
| 2009/0163216 A1 | 6/2009 | Hoang et al. | |
| 2011/0116476 A1* | 5/2011 | Lee .................. | H04W 52/241 370/331 |
| 2011/0170466 A1* | 7/2011 | Kwun .............. | H04W 52/0235 370/311 |
| 2012/0039238 A1* | 2/2012 | Li .................... | H04W 52/0232 370/315 |

FOREIGN PATENT DOCUMENTS

WO    2010/098104 A1    9/2010

OTHER PUBLICATIONS

"LTE; Evolved Universal Terrestrial Radio Access (E-UTRA) and Evolved Universal Terrestrial Radio Access Network (E-UTRAN); Overall description; Stage 2(3GPP TS 36.300 version 10.3.0 Release 10)", Technical Specification, European Telecommunications Standards Institute (ETSI), 650, Route Des Lucioles; F-06921 Sophia-Antipolis; France, vol. 3GPP RAN 2, No. V10.3.0, Apr. 1, 2011, XP014065364.
Mitsubishi Electric: "Dynamic Set Up of HNBs for Energy Savings and Interference Reduction", 3GPP Draft; R3-081949 (Dynamic Setup HNBS), 3rd Generation Partnership Project (3GPP), Mobile Competence Centre; 650, Route Des Lucioles; F-06921 Sophia-Antipolis Cedex; France vol. RAN WG3, No. Jeju Island; Aug. 13, 2008, XP0501165010.
Sujuan Feng et al: "Self-Organizing Networks (SON) in 3GPP Long Term Evolution" Internet Citation, May 20, 2008, pp. 1-15, XP002526917.
International Search Report for PCT/EP2012/059456 dated Jul. 13, 2012.

* cited by examiner

*Primary Examiner* — Kwasi Karikari
(74) *Attorney, Agent, or Firm* — Sughrue Mion, PLLC

(57) ABSTRACT

The method comprises:
 a user equipment measuring its proximity to one or more cells, or radio access nodes, by detecting the signal emission power thereof, and recognizing some cells as distinctive cells which radio section can be switched off when no user equipment is camping in it;
 determining that at least one of said cells is candidate for cell reselection or handover as a function of said signal emission power, and, if the cell is a distinctive cell, directly determining it as a candidate cell even if its signal emission power is not detected; and
 performing the cell reselection or handover between the user equipment and the candidate cell.

17 Claims, No Drawings

METHOD FOR CELL RESELECTION AND CELL HANDOVER IN A WIRELESS COMMUNICATION SYSTEM

CROSS REFERENCE TO RELATED APPLICATIONS

This is a National Stage of International Application No. PCT/EP2012/059456 filed May 22, 2012, claiming priority based on Spanish Patent Application No. P201130865 filed May 26, 2011, the contents of all of which are incorporated herein by reference in their entirety.

FIELD OF THE ART

The present invention generally relates to a method for cell reselection and cell handover in a wireless communication system, comprising a user equipment performing said cell reselection or handover as a function of a proximity measure, and more particularly to a method comprising recognizing some cells as distinctive cells which radio section can be switched off when no user equipment is camping in it.

PRIOR STATE OF THE ART

Spanish Patent application P201031815 describes a procedure for switching off a H(e)NB when no user equipment (UE) is camping in it, and switching it on when the UE is very close to the H(e)NB, based in the use of a short range radio link between the UE and the H(e)NB, that once established makes it possible to know that the UE is in the immediate vicinity of the H(e)NB and thus switch on the radio section. The rationale for this procedure is the reduction of energy consumption and radio interference of the H(e)NB, thus improving energy efficiency and data throughput, in the deployment of femtonodes at the customers' premises, and in general in the deployment of multi-interface telecommunication nodes, labelled as "Radio Access Node" in Spanish patent 2 334 482 [1] and in Spanish patent application P200802049. This procedure makes it possible to switch on any radio interface only when the customer is in the interior of his/her premises.

On the other hand, UE's must be able to implement mobility procedures to a H(e)NB, in idle mode (cell-reselection) and in connected mode (cell handover). Mobility decisions in E-UTRAN rely on measurements performed by the UE, so the UE needs to measure a certain number of base stations, basically the detected power from them or RSRP, in order to determine a candidate for cell reselection or handover.

In LTE, the cell reselection and handover procedures are triggered by UE measurements of the serving cell power level, and the power level of other cell in the same or other frequency bands. The power level of every cell is measured by means of the Reference Signal Receive Power (RSRP) parameter, as stated in 3GPP TS 36.214 [2].

The UE autonomously triggers the cell reselection [3] [4] or handover [5] procedures when the RSRP of the serving cell is below a given threshold. When the UE is in idle mode, it selects the cell with the highest RSRP among the cells it has measured and camps in it. When the UE is in connected mode, the UE requests to the LTE Mobility Management Entity (MME) to start the handover process to the cell with the highest RSRP among the cells it has measured.

The cell reselection procedure allows the UE to select a more suitable cell and camp on it. When the UE is in either Camped Normally state or Camped on Any Cell state on a cell, the UE shall attempt to detect, synchronise, and monitor intra-frequency, inter-frequency and inter-RAT cells indicated by the serving cell. For intra-frequency and inter-frequency cells the serving cell may not provide explicit neighbour list but carrier frequency information and bandwidth information only. The UE measurement activity is also controlled by measurement rules defined in TS36.304, allowing the UE to limit its measurement activity. The UE shall be able to identify new intra and inter frequency cells and perform RSRP measurements of identified intra-frequency cells without an explicit intra-frequency neighbour list containing physical layer cell identities.

In the connected mode, the handover procedure is fully controlled by the network, as it is stated in 3GPP TS 36.331. The network decides when to perform a handover and which will be the target cell, but the decision takes into account the measurements performed by the UE. To facilitate this, the network may configure the UE to perform measurement reporting, possibly including the configuration of measurement gaps. 3GPP TS 36.331 describes a Proximity Indication procedure to indicate to the E-UTRAN that the UE is entering or leaving the proximity of one or more cells whose CSG IDs are in the UEs CSG whitelist, in order to prepare the handover process. The detection of proximity is based on an autonomous search function as defined in TS 36.304, for example the measurement of neighbour cells RSRP.

If the UE enters the proximity of one or more cell(s), whose CSG IDs are in the UEs CSG whitelist, the UE initiates the transmission of the ProximityIndication message to the E-UTRAN. The UE shall indicate in the ProximityIndication message the CSG ID of the cell it is entering.

Another aspect to be taken into account is the types of H(e)NB's that are currently specified by 3GPP TS 25.367, which affects the mobility of a UE to a H(e)NB. A H(e)NB may provide restricted access to only UEs belonging to a Closed Subscriber Group (CSG). One or more of such cells providing restricted access, known as CSG cells, are identified by a unique numeric identifier called CSG Identity. To facilitate access control, a UE with CSG subscription would have a CSG whitelist, which contains one or more CSG Identities associated with the CSG cells on which the UE is allowed access. The UE uses the CSG whitelist along with the CSG Identity broadcast by the CSG Cells in CSG cell selection and reselection. A H(e)NB can also be operated as a hybrid cell. A hybrid cell is accessed as a CSG cell by a UE whose CSG whitelist contains the cell's CSG ID and as a normal cell by all other UEs. Members of the CSG are expected to receive preferential access.

Problems with Existing Solutions:

The standard cell reselection and handover procedure could not work properly when the UE is moving from the coverage area of a macrocell to that of a H(e)NB whose radio section has been switched off when no UE is camping in it, in particular when the H(e)NB switch on procedure is performed only when the UE approaches to a very short distance of the H(e)NB. In the case the UE is leaving the macrocell coverage and it is getting into the vicinity of the still switched off H(e)NB, the UE will not have stored the H(e)NB cell RSRP among its reselection and handover candidate cells list. When the UE is in idle mode, this will mean that there will be a period of time, from the moment it leaves the coverage area of the macrocell, until it detects the RSRP of the H(e)NB once it has been switched on, during which the UE will not be camping in any cell, and will be thus disconnected from the mobile network.

On the other hand, when the UE is in connected state, the hand over procedure between the macrocell and the H(e)NB could not be performed on time to keep the connection between the UE and the core network active, because the UE will leave the coverage area of the macrocell and it will have to wait for the H(e)NB to switch on, spend a certain period of time to measure its RSRP, and request to the MME to start the handover procedure.

Some work has been done to improve the UE measurement process for cell reselection and handover between standard LTE base stations that do not implement a radio section switch on/off procedure. For example International application WO2009030289A1 "Cell reselection based on use of relative thresholds in a mobile telecommunication system", proposes a method to optimize the UE measurement, dedicating more time and accuracy for the measurement of certain preferred base stations. However, no work has been done to solve the specific problem of cell reselection and handover to a H(e)NB whose radio section is off and thus the UE cannot measure any parameter of the target cell.

DESCRIPTION OF THE INVENTION

It is necessary to offer an alternative to the state of the art, which covers the gaps found therein, by providing a method which takes into account that some of the cells can be switched off when no user equipment is camping in it.

To that end, the present invention provides a method for cell reselection and cell handover in a wireless communication system, comprising:
a user equipment measuring its proximity to at least one cell, or radio access node, such as a femtocell, by at least detecting the signal emission power thereof;
determining that said at least one cell is a candidate for cell reselection or handover as a function of said signal emission power; and
performing said cell reselection or handover between said user equipment and said candidate cell.

On contrary to known proposals, the method of the invention comprises said user equipment recognizing some cells as distinctive cells which radio section can be switched off when no user equipment is camping in it, and determining them as candidate cells for cell reselection or handover even if their signal emission power is not detected.

The method is particularly applicable to a wireless communication system supporting a closed subscriber group service (CSG), where the user equipment can connect only to a restricted list of CSG cells.

Other embodiments of the method of the invention are described according to appended claims 2 to 17, and in a subsequent section related to the detailed description of several embodiments.

Detailed Description Of Several Embodiments

By means of different embodiments of the method of the invention, the User Equipment cell reselection and handover to a H(e)NB whose radio section can be switched off when no UE is camping in it is improved.

One or more Closed Subscriber Group (CSG) cells are identified by a unique numeric identifier called CSG Identity or CSG ID. A UE belonging to a CSG has the corresponding CSG ID in its CSG whitelist. The CSG whitelist is maintained and provided by Non-Access Stratum (NAS) procedures. The CSG ID is broadcast in system information by the CSG cell or hybrid cell. A cell may optionally broadcast the CSG Indicator, whose presence and value of TRUE indicates the cell is a CSG cell. The absence of the CSG indicator in a cell which broadcasts a CSG identity indicates that it is a hybrid cell. A CSG cell or hybrid cell may broadcast the H(e)NB Name, a textual identifier, in system information. The H(e)NB Name can be used to aid the human user in manual selection of a CSG ID.

The method of the invention specifies that a new identifier is added to the current CSG H(e)NB description, the CSG Power parameter, which is added to the current CSG ID and CSG Indicator parameters, as described in [7], and to the H(e)NB Name. The CSG Power parameter indicates that a H(e)NB radio section can be switched off when no UE is camping in it, and that it can be switched on when the UE is near the H(e)NB.

For those H(e)NB's stored in the UE list whose CSG Power parameter is TRUE, it means that the radio section of the H(e)NB can be switched off when no UE is camping in it, and that it can be switched on when the UE is near the H(e)NB. If the CSG Power parameter is FALSE, it means that the radio section of the H(e)NB is not switched off when no UE is camping in it. The proximity of the UE to the H(e)NB can be detected by means of any procedure. The main embodiment of the method of the invention is designed for the case that the proximity detection is done by means of a short radio interface between the UE and the H(e)NB, as described in spanish patent application P201031815, but no other short proximity detection procedure is precluded.

When a short radio interface between the UE and the H(e)NB is used for detecting the proximity of the UE to the H(e)NB, both the UE and the H(e)NB will be equipped with a low power and short range radio interface which establishes a link between them only when they are separated a few tens of meters from each other.

For those H(e)NB's stored in the UE whitelist whose CSG parameter is TRUE, the UE will store their physical-layer cell identity or CELL ID [8], in order speed up the synchronization process once those H(e)NB's are detected. There are 504 unique physical-layer cell identities. The physical-layer cell identities are grouped into 168 unique physical-layer cell-identity groups (also known as Cell Group Identity, CGI), each group containing three unique identities. A physical-layer cell identity is thus uniquely defined by a number in the range of 0 to 167, representing the physical-layer cell-identity group, and a number in the range of 0 to 2, representing the physical-layer identity within the physical-layer cell-identity group. The UE can deduce the physical-layer identity number from the Primary Synchronization Signal [9], and the physical-layer cell-identity group number from the Secondary Synchronization Signal [10].

In the method of the invention, for those H(e)NB's stored in the UE whose CSG Power parameter is TRUE, the UE will also always store them with a value of the RSRP parameter. In the case the UE does not actually detect and measure the H(e)NB, the RSRP value will be fictitious, and could be set to a very low value measured in dBm, or could be set to a non-numerical character like LOW or NOTDETECTED. In the case the UE does detect and measure the H(e)NB, the RSRP value will be set to the measured value. In this way, every H(e)NB stored in the UE whitelist whose CSG Power parameter is TRUE will be stored as a candidate cell for reselection and handover.

When the UE gets close to the H(e)NB, a short range radio link will be established between the UE and the H(e)NB, as it is described in spanish patent application P201031815, and the H(e)NB radio section is switched on in a time $T_{on}$. In the method of the invention, when the short range radio link between the UE and the H(e)NB is established, the stored RSRP value in the UE corresponding to that H(e)NB will be automatically updated from a fictitious low value, or from LOW or NOTDETECT, to another fictitious high value measured in dBm, or to a non-numerical character like HIGH or DETECTED, in a time $T_{switch}$, with the limitation that $$T_{switch} < T_{on}.$$

This is done automatically once the short range radio link is set. This procedure reduces the time needed for cell reselection or handover because the target H(e)NB is in the UE's detected cells list before the H(e)NB radio section is actually switched on, and will be classified as the best candidate cell after Tswitch without the UE needing to wait for the next measuring gap to measure the real RSRP value of the H(e)NB.

Once the RSRP value is set to a fictitious high value, or to HIGH or DETECTED, the UE immediately triggers the cell reselection or handover procedures. In both cases, this will involve decoding the Reference Signals, and the P-SCH and S-SCH channels, and this process will be speeded up thanks to the fact that the UE knows in advance the CELL ID of the H(e)NB.

The current specification for cell re-selection, 3GPP TS 36.133 [4], specifies that the UE shall measure the RSRP level of the serving cell and evaluate the cell selection criterion S defined in [11] for the serving cell at least every DRX cycle. The UE shall filter the RSRP measurements of the serving cell using at least 2 measurements. Within the set of measurements used for the filtering, at least two measurements shall be spaced by, at least DRX cycle/2. If the UE has evaluated in Nsery consecutive DRX cycles that the serving cell does not fulfil the cell selection criterion S, the UE shall initiate the measurements of all neighbour cells indicated by the serving cell. 3GPP TS 36.133 [4] specifies in table 4.2.2.1-1 that minimum Nsery consecutive DRX cycles is 4, and thus the minimum DRX cycle length is 0.32 seconds. This means that with the current LTE specification, the UE will need at least 0.32 seconds to determine that the macro serving cell RSRP is below cell criterion S and begin to measure the neighbour cells RSRP.

Cell Re-Selection Improvement Procedure:

The current specification for cell re-selection, 3GPP TS 36.133, specifies that once the UE determines that the macro serving cell RSRP is below cell criterion S, the UE begins to measure the neighbour cells RSRP. The process is described in [12] for intra-frequency reselection and in [13] for inter-frequency reselection.

For intra-frequency reselection the UE shall be able to identify new intra-frequency cells and perform RSRP measurements of identified intra-frequency cells without an explicit intra-frequency neighbour list containing physical layer cell identities.

The UE shall be able to evaluate whether a newly detectable intra-frequency cell meets the reselection criteria defined in TS36.304 within $T_{detect,EUTRAN\_Intra}$.

The UE shall measure RSRP at least every $T_{detect,EUTRAN\_Intra}$ (see TS 36.304 table 4.2.2.3-1) for intra-frequency cells that are identified and measured according to the measurement rules.

For an intra-frequency cell that has been already detected, but that has not been reselected to, the filtering shall be such that the UE shall be capable of evaluating that the intra-frequency cell has met reselection criterion S within $T_{evaluate\ E-UTRAN\_intra}$ as specified in table 4.2.2.3-1 (see below) provided that the cell is at least 3 dB better ranked.

3GPP TS 36.133 Table 4.2.2.3-1: $T_{detect,EUTRAN\_Intra}$, $T_{measure,EUTRAN\_Intra}$ and $T_{evaluate,E-UTRAN\_intra}$

| DRX cycle length [s] | $T_{detect,EUTRAN\_Intra}$ [s] (number of DRX cycles) | $T_{measure,EUTRAN\_Intra}$ [s] (number of DRX cycles) | $T_{evaluate,EUTRAN\_intra}$ [s] (number of DRX cycles) |
|---|---|---|---|
| 0.32 | 11.52 (36) | 1.28 (4) | 5.12 (16) |
| 0.64 | 17.92 (28) | 1.28 (2) | 5.12 (8) |
| 1.28 | 32 (25) | 1.28 (1) | 6.4 (5) |
| 2.56 | 58.88 (23) | 2.56 (1) | 7.68 (3) |

This table means that the UE can need up to 1.28 seconds to measure a new cell. For the case of inter-frequency cell reselection, the data is gathered in 3GPP TS 36.133 Table 4.2.2.4-1, and the minimum measurement time is the same, 1.28 seconds.

When the UE is moving from the coverage area of a macro cell to that of an indoor H(e)NB, the coverage of the macro cell can end abruptly. With the standard LTE cell re-selection procedure, and when the H(e)NB is switched on only when the UE is very near the H(e)NB, the UE will need 0.32 seconds to detect that the macro cell RSRP is below the reselection criterion S, and another 1.28 seconds t measure the RSRP of the H(e)NB.

The method of the invention reduces the H(e)NB measurement time to zero, because once the short range radio link between the UE and the H(e)NB is established, the UE sets the stored value of the H(e)NB RSRP to a fictitious high value, or to HIGH or DETECTED, without the need to wait for any DRX cycle. This is done even before the UE decodes the CSG ID of the H(e)NB, including the CSG Power parameter.

For performing the cell reselection procedure, the UE must decode the H(e)NB Reference Signals, and the P-SCH and S-SCH channels, and this process will be speeded up thanks to the fact that the UE knows in advance the CELL ID of the H(e)NB.

The CELL ID or physical-layer cell identity of the H(e)NB is defined by the number, representing the physical-layer cell-identity group, and a the number, representing the physical-layer identity within the physical-layer cell-identity group. If the UE knows in advance both the number and the number of the H(e)NB, it can deduce the pattern of the cell-specific Reference Signal, as it is described in 3GPP TS 36.211 [14], the pattern of the P-SCH [9], and the pattern of the S-SCH [10] before the H(e)NB signal is actually detected.

Cell Handover Improvement Procedure:

3GPP TS 36.331 [16] describes a Proximity Indication procedure to indicate to the E-UTRAN that the UE is entering or leaving the proximity of one or more cells whose CSG IDs are in the UEs CSG whitelist, in order to prepare the handover process. The detection of proximity is based on an autonomous search function as defined in TS 36.304, for example the measurement of neighbour cells RSRP. 3GPP TS 36.331 [17] states that the E-UTRAN network controls UE mobility, based on radio conditions measured by the UE When the UE is leaving the coverage area of a macro cell and getting close to an indoor H(e)NB, the measurements procedure envisaged in 3GPP TS 36.304 for detecting proximity will not work properly, as the area of transition between the coverage of the macro cell and the H(e)NB is very narrow, and this is particularly true when the radio section of the H(e)NB is switched off. The method of the invention generates the ProximityIndication when the short range radio link between the UE and the H(e)NB is set.

In the method of the invention, the RSRP of the target H(e)NB is automatically set to a fictitious high value, or to HIGH or DETECTED, when the short range radio link between the UE and the H(e)NB is set. In this way, the E-UTRAN network will not have to configure any measurement gap in the UE to measure the target cell RSRP.

On the other hand, 3GPP TS 36.133 [15] describes the UE measurements procedures in RRC_CONNECTED State, and states that no explicit neighbour list is provided to the UE for identifying a new Cell Group Identity (or physical-layer cell-identity group) of the H(e)NB target cell. The UE shall identify and report the CGI when requested by the network. If autonomous gaps are used for measurement, the UE shall be able to identify a new CGI of a H(e)NB cell within:

$$T_{identify\_C\ GI,\ intra} = T_{basic\_identify\_C\ GI,\ intra}\ ms$$

where $T_{basic\_identify\_CGI,\ intra} = 150$ ms. This is the time period used in the above equation where the maximum allowed time for the UE to identify a new CGI of an E-UTRA cell is defined.

In the method of the invention $T_{basic\_identify\_CGI,\ intra}$ is reduced to 0 ms, because once the short range radio link between the UE and the H(e)NB is established, the UE knows that it is in the immediate vicinity of the H(e)NB, and also knows in advance the value of the CGI of that H(e)NB.

A person skilled in the art could introduce changes and modifications in the embodiments described without departing from the scope of the invention as it is defined in the attached claims.

Advantages of the Invention

The main advantages of the method of the invention are to speed up the cell reselection and handover process of a UE to a H(e)NB, whose radio section is only switched on when the UE gets close to the H(e)NB.

When the radio section of a H(e)NB is switched off when no UE is camping in it, and it is switched on when the UE is very close to it, the current 3GPP procedures for cell re-selection and handover cannot work properly. The procedures described in the method of the invention overcome that limitation.

Acronyms and Abbreviations:

CELL ID Cell Identifier
CGI Cell Group Identity
CSG Closed Subscriber Group
DRX Discontinuous Reception
E-UTRAN Evolved UTRAN
H(e)NB Home e Node B, Home Node B
LTE Long Term Evolution
P-SCH Primary Synchronization Channel
RRC Radio Resource Control
RSRP Reference Signal Receive Power
S-SCH Secondary Synchronization Channel
UE User Equipment

REFERENCES

[1] Nodo de telecomunicaciones multi-interfaz. Spanish Patent number 2 334 482
[2] 3GPP TS 36.214, Physical layer—Measurements, section 5.1.1 Reference Signal Received Power (RSRP)
[3] 3GPP TS 36.304, User Equipment (UE) procedures in idle mode, section 5.2 Cell selection and reselection
[4] 3GPP TS 36.133, Requirements for support of radio resource management, section 4 E-UTRAN RRC_IDLE state mobility
[5] 3GPP TS 36.133, Requirements for support of radio resource management, Section 5 E-UTRAN RRC_CONNECTED state mobility
[6] 3GPP TS.25.367 Mobility procedures for Home Node B (HNB); Overall description; Stage 2. Section 4 Overview
[7] 3GPP TS.25.367 Mobility procedures for Home Node B (HNB); Overall description; Stage 2. Section 5 CSG Identification
[8] 3GPP TS 36.211 Physical Channels and Modulation. Section 6.11 Synchronization signals
[9] 3GPP TS 36.211 Physical Channels and Modulation. Section 6.11.1 Primary synchronization signal
[10] 3GPP TS 36.211 Physical Channels and Modulation. Section 6.11.2 Secondary synchronization signal
[11] 3GPP TS 36.304, User Equipment (UE) procedures in idle mode, section 5.2.3.2 Cell Selection Criterion
[12] 3GPP TS 36.133, Requirements for support of radio resource management, section 4.2.2.3 Measurements of intra-frequency E-UTRAN cells
[13] 3GPP TS 36.133, Requirements for support of radio resource management, section 4.2.2.4 Measurements of inter-frequency E-UTRAN cells
[14] 3GPP TS 36.211 Physical Channels and Modulation. Section 6.10.1 Cell-specific reference signals
[15] 3GPP TS 36.133, Requirements for support of radio resource management, section 8.1.2.2.3.1 Identification of a new CGI of E-UTRA cell with autonomous gaps
[16] 3GPP TS 36.331 Radio Resource Control (RRC); Protocol specification. Section 5.3.14 Proximity indication
[17] 3GPP TS 36.331 Radio Resource Control (RRC); Protocol specification. Section 5.3.1.3 Connected mode mobility

The invention claimed is:

1. A method for cell reselection and cell handover in a wireless communication system, comprising:
a user equipment measuring its proximity to at least one cell, or radio access node, by at least detecting the signal emission power thereof;
determining that said at least one cell is a candidate for cell reselection or handover as a function of said signal emission power; and
performing said cell reselection or handover between said user equipment and said candidate cell;
wherein the method comprises said user equipment recognizing some cells as distinctive cells which radio section can be switched off when no user equipment is camping in it, and determining them as candidate cells for cell reselection or handover even if their signal emission power is not detected.

2. The method of claim 1, further providing at said user equipment, for each of said distinctive cells, a low fictitious value for said signal emission power in case the distinctive cell signal emission power is not detected.

3. The method of claim 2, comprising updating said low fictitious value to a high fictitious value, for said signal emission power of each of said distinctive cells, upon establishing a radio link between said user equipment and said distinctive cell.

4. The method of claim 3, wherein said radio link is a short range radio link.

5. The method of claim 3, wherein said updating of said low fictitious value to said high fictitious value is carried out before the radio section of the distinctive cell is switched on.

6. The method of claim 2, comprising, for each of said distinctive cells, detecting the signal emission power thereof and updating said low fictitious value to the detected value.

7. The method of claim 3, comprising, once said signal emission power of each of said distinctive cells is at said high fictitious value, triggering the needed procedures for performing said cell reselection or handover between the user equipment (UE) and the corresponding candidate distinctive cell.

8. The method as per claim 1, wherein it is a applied to a wireless communication system supporting a closed subscriber group service, said cells belonging to a Closed Subscriber Group, or CSG, the method comprising said user equipment storing a whitelist of said cells in the form of CSG-related information including, for each cell, at least a CSG identity and also a power parameter indicating if they are distinctive cells or not.

9. The method of claim 8, comprising including in said whitelist, said measured and/or low and/or high fictitious values regarding said signal emission power, associated to their corresponding cell, in the form of reference signal receive power, or RSRP, parameter values.

10. The method of claim 9, comprising including in said whitelist, for said distinctive cells, their physical layer cell identity in order to speed up the synchronization process once they are detected.

11. The method as per claim 10, wherein said synchronization procedures include decoding the reference signals and the primary synchronization and secondary synchronization channels, or P-SCH and S-SCH.

12. The method of claim 11, comprising deducing the pattern of said reference signals, of said P-SCH and of said S-SCH before detecting the distinctive cell signal emission, by using said physical layer cell identity.

13. The method of claim 1, wherein said cells are femtocells.

14. The method of claim 1, wherein said user equipment is a wireless portable processing device.

15. The method of claim 1, wherein said determining of candidate cells for reselection is performed by said user equipment.

16. The method of claim 1, wherein said determining of candidate cells for handover is performed by a network of said wireless communication system, the user equipment communicating said measured and/or low and/or high fictitious values regarding said signal emission power, associated to their corresponding cell, to said network.

17. The method of claim 16, wherein said network is an Evolved Universal Terrestrial Radio Access Network, or E-UTRAN.

* * * * *